Feb. 2, 1965 E. W. TURPIN 3,168,130
WHEEL SUPPORTING AND TIRE DISMOUNTING APPARATUS
Filed Aug. 20, 1963 3 Sheets-Sheet 1
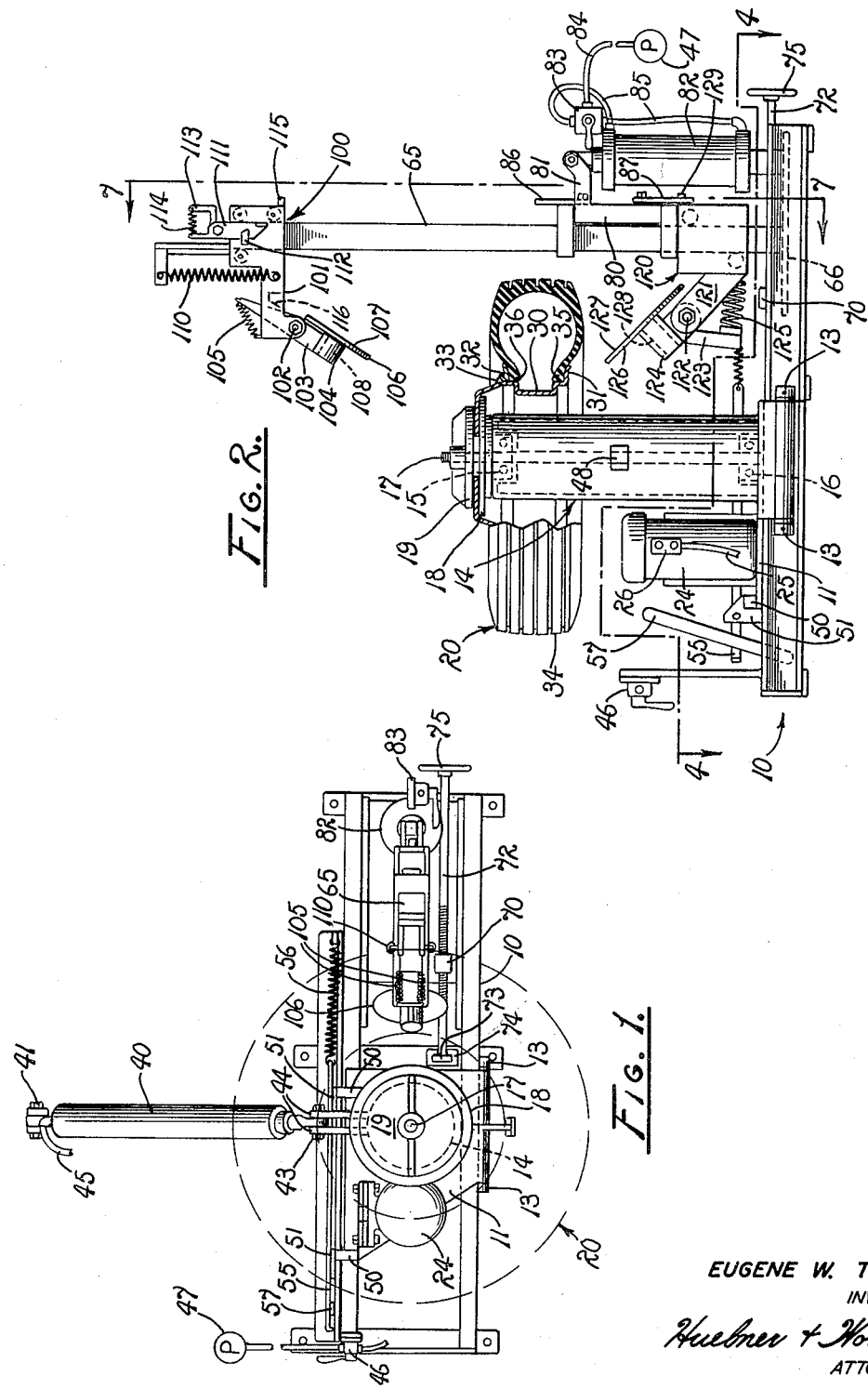
EUGENE W. TURPIN
INVENTOR
Huebner + Worrel
ATTORNEYS

EUGENE W. TURPIN
INVENTOR

Huebner & Worrel
ATTORNEYS

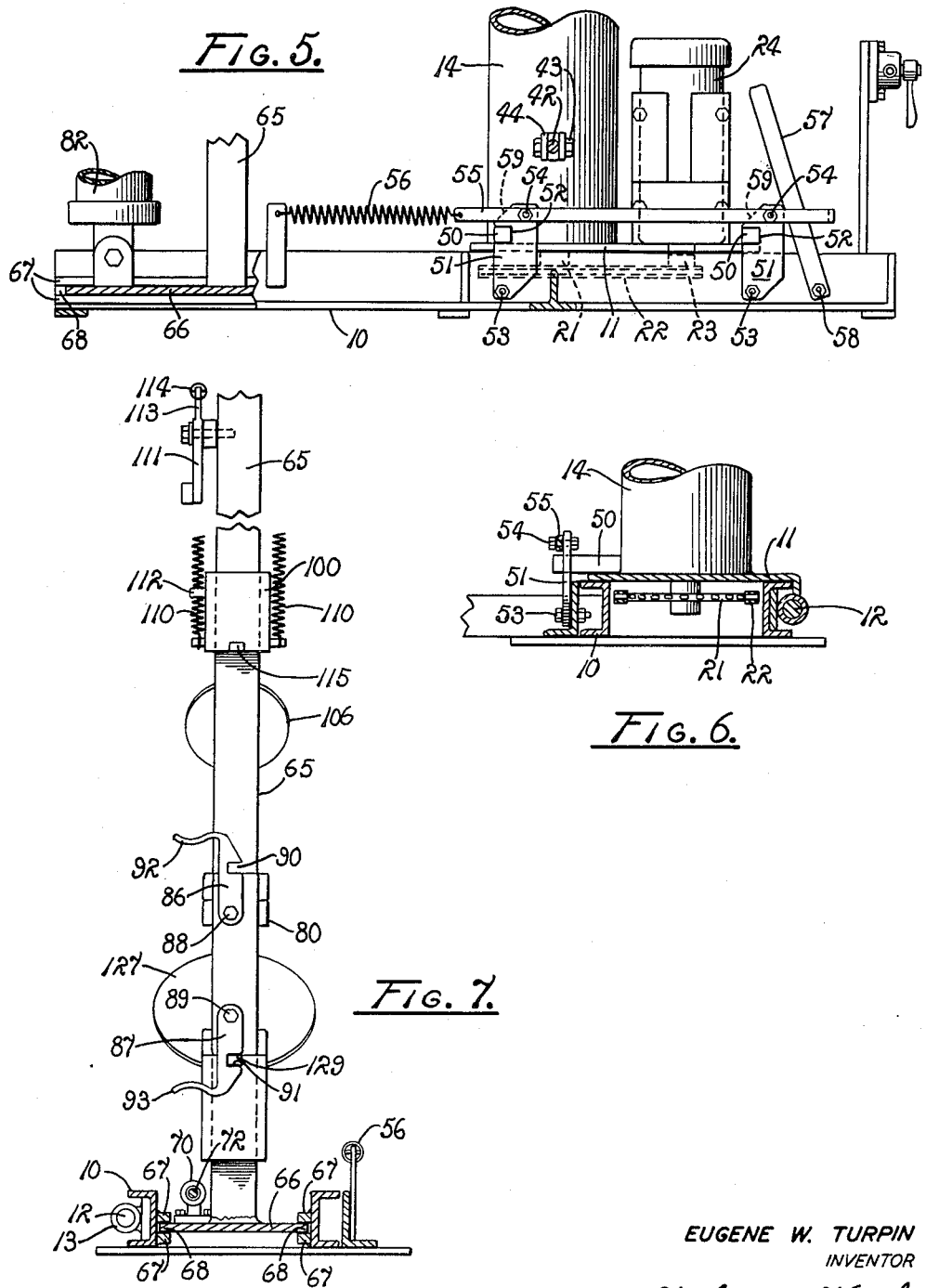

United States Patent Office 3,168,130
Patented Feb. 2, 1965

3,168,130
WHEEL SUPPORTING AND TIRE DISMOUNTING
APPARATUS
Eugene W. Turpin, 66 N. Academy, Sanger, Calif.
Filed Aug. 20, 1963, Ser. No. 303,285
6 Claims. (Cl. 157—1.28)

The present invention relates to a wheel supporting and tire dismounting apparatus and has particular utility in moving the beads of a pneumatic tire out of engagement with complementary portions of the rim of a wheel on which the tire is mounted and in manipulating the tire both before and after such bead disengagement.

Previously known methods of, and apparatus for, removing a tire from the wheel on which it is mounted included the use of various types of manually operated levers and powered pressure applying devices. A particularly universal difficulty has been encountered in moving the beads of a tire out of engagement with the flanged rim of the wheel. Such difficulty is occasioned by virtue of the fact that long periods of inflation of such pneumatic tires result in an adherence of the side wall beads to the flanged rim.

In the case of large tires, such as those required for large vehicles of a class including trucks, buses, tractors, and earth moving equipment, the size and weight of the tires present a problem of manipulation for dismounting. In addition, the tire carcass intended for use on such a vehicle is necessarily of a construction conforming to an established ply rating for heavy duty service. Consequently, the side walls of such tires are of limited flexibility, and in some tire constructions, the side walls are quite rigid when compared to contemporary automobile tires. Accordingly, great difficulty is experienced in moving the beads of such side walls out of engagement with their rim flanges.

In certain types of truck wheels, the rim is fabricated in the form of axially opposed flanges, one of which is separable from the wheel. The separable flange is in the form of an annular member which is radially split to facilitate removal from the wheel. Suitable retaining or locking members are provided to maintain the member in an annular configuration when assembled on the wheel. However, an arduous task is encountered in attempting to remove tires from such rims, and frequent resort is made to pounding the tire and the rim with a heavy hammer to loosen the tire bead from the flange. In view of such difficulty, a need has been recognized for power operated apparatus to facilitate dismounting of such tires.

Considering the large size and great weight of contemporary wheel assemblies for trucks, buses, and the like, a need has also been recognized for power operated apparatus to support such wheel assemblies in a position to facilitate dismounting of the tire.

Accordingly, an object of the present invention is to provide apparatus adapted to support a wheel assembly in a position to dismount the tire from the wheel thereof.

Another object is to provide apparatus for moving the beads of a pneumatic tire out of engagement with complementary portions of the rim of a wheel on which the tire is mounted.

Another object is to provide apparatus specifically adapted for removing a large heavy-duty tire from the wheel on which it is mounted.

Another object of the invention is to provide tire dismounting apparatus which permits removal of the tire from a wheel in which it is mounted with a minimum of wheel re-positioning.

A further object of the invention is to provide a wheel supporting and tire dismounting apparatus which is adapted to disengage both of the beads of the tire from their respective complementary portions of a wheel rim without the necessity of over-turning the tire and wheel during the dismounting process.

A still further object is to provide a wheel supporting apparatus to facilitate the handling and positioning of a wheel and especially to provide such an apparatus adapted to receive such a wheel in rolling ground engagement and move the wheel to and from an axially erect position for work thereon.

These, together with other objects and advantages, will become more fully apparent upon reference to the following description and accompanying drawings.

In the drawings:

FIG. 1 is a top plan view of a tire supporting and dismounting apparatus embodying the principles of the present invention, a tire and wheel assembly being shown in dashed lines in a position supported by the apparatus.

FIG. 2 is a view in front elevation of the apparatus of FIG. 1, portions of the tire and apparatus being broken away for illustrative convenience.

FIG. 5 is a fragmentary enlarged view in rear elevation of the apparatus of FIG. 1.

FIG. 6 is a fragmentary view of the apparatus of FIG 1 taken in a plane represented by the line 6—6 of FIG. 4.

FIG. 7 is a fragmentary enlarged view, in transverse vertical section, taken on line 7—7 of FIG. 2.

Figure 3:
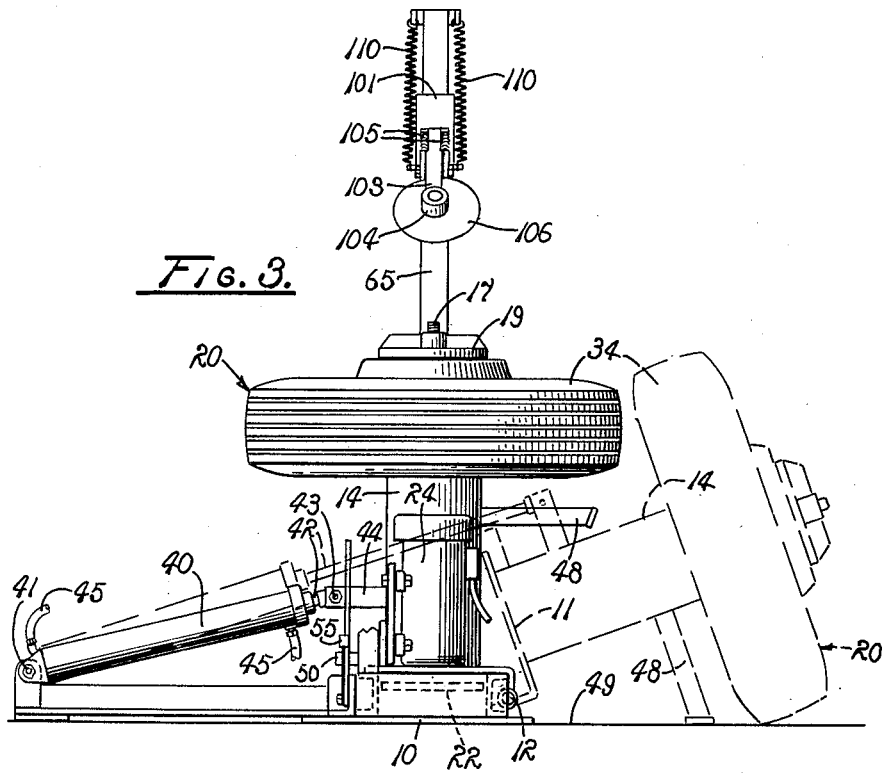
FIG. 3 is a view in side elevation of the apparatus of FIG. 1, shown in full lines in an upright tire dismounting position and in dashed lines in an inclined wheel loading and discharging position.

Referring in greater particularity to FIGS. 1, 2 and 3, the apparatus of the present invention provides an elongated base 10 on which a platform bracket 11 is pivotally mounted by an elongated shaft 12. The bracket 11 serves as a sub-base and facilitates movement from a tire dismounting position shown in full lines in FIG. 3 and a tire loading and discharging position shown in dashed lines. A pair of axially spaced lugs 13 are rigidly secured to the base 10, and support the shaft 12 in a position to provide a substantially horizontal pivotal axis for the bracket 11. A substantially cylindrical column 14 is rigidly secured to the bracket 11 and supports vertically spaced upper and lower bearings 15 and 16 at the respective opposite ends thereof. An elongated spindle 17 is rotatably mounted in the bearings and provides a circular table 18 rigidly secured to the upper end thereof and projecting from the column 14. A clamping member 19 is screw-threadably releasably secured to the spindle 18 thereby dependably to support between the table and the clamping member a wheel assembly, generally indicated at 20.

Figure 4:
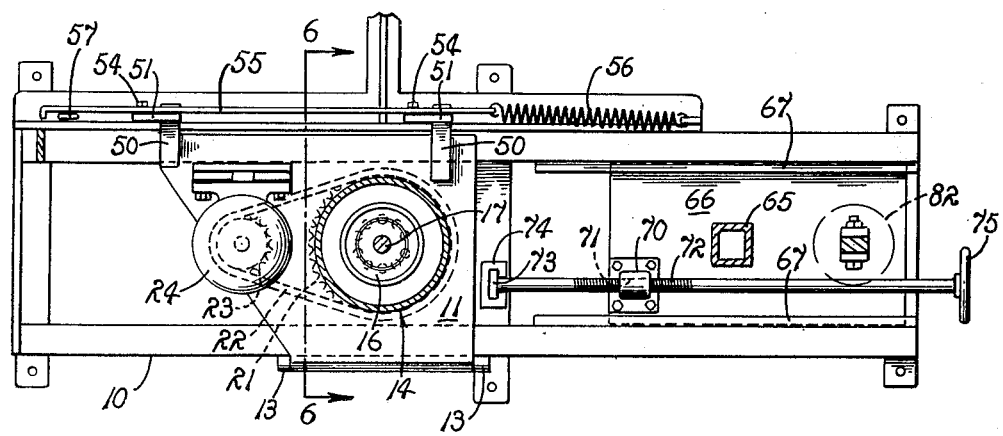
FIG. 4 is an enlarged view in horizontal longitudinal section, taken on line 4—4 of FIG. 2.

As can be seen in FIG. 4, a sprocket 21 is rigidly carried at the lower end of the spindle 17. A chain 22 is trained about the sprocket 21 and connects this sprocket in driving relationship to a sprocket 23 secured to the output shaft of a drive motor 24 mounted on the bracket 11. The motor 24 is connected to a suitable source of electrical current, not shown, by means of a conductor fragmentarily illustrated at 25. Controlled rotation of the motor 24, and consequently spindle 17 and wheel assembly 20, is effected through operation of a switch 26.

The wheel 20 includes a rim portion 30 provided with axially opposed flange portions 31 and 32. As illustrated in FIG. 2, the flange 31 is an integral part of the rim 30, while the flange 32 is separable therefrom. As can be seen in FIG. 1, the flange 32, when assembled on the wheel 20, is in the form of an annulus. The annulus is radially split and releasably retained by any suitable locking means, not shown, in an assembled position to permit disassembly of the wheel 20. A peripheral retaining rim 33 is provided on the wheel to determine the axial spacing of the flanges 31 and 32 and to maintain the latter in assembled position.

A tire 34 is mounted on the rim 30 and provides axially opposed beads 35 and 36 as integral portions of the tire side wall. The beads 35 and 36 are adapted to engage in sealing relationship with a respective one of the flanges 31 and 32.

As can be seen more clearly in FIGS. 1 and 3, a pressure fluid actuated ram 40 is pivotally connected to the base 10 by means of a pin 41. A piston rod 42 is longitudinally reciprocably received in the ram and connected to the column 14 by means of a second pivot pin 43 carried in an arm 44 radially projecting from the column 14. A pair of flexible conduits 45 alternately serve as supply and return lines for pressure fluid selectively admitted by means of a control valve 46 which is supplied with pressure fluid from a source schematically illustrated at 47. A rigid strut 48 is radially extended from the column 14 and adapted to engage a floor 49 which serves as a surface of support for the apparatus. As illustrated in FIG. 3 in dashed lines, the strut 48 is dimensioned to position the column 14 and the upper end of the spindle 17 in a tire loading and discharging position at an appropriate location to receive the wheel assembly 20.

As can be seen more clearly in FIG. 5, the column 14 is releasably maintained in an upright tire dismounting position by means of a pair of spaced locking bars 50 rigidly extended from the bracket 11. Each of the bars 50 is releasably held by a respective one of a pair of latches 51, each having a respective bar receiving notch 52. Each of the latches 51 is pivotally mounted on the base 10 by a respective pivot pin 53. Respective upper pivot pins 54 connect both of the latches 51 to a common release link 55. A biasing spring 56, anchored to the base at one end and connected to the releasing link 55 at its opposite end, urges the latches 51 toward a locked position, as shown in FIG. 5. A release lever 57 is pivotally mounted on the base by means of a pin 58 and permits selective release of the locking bars 50 from the latches 51 upon clockwise rocking of the lever 57, as viewed in FIG. 5. Each of the latches 51 is provided with a respective cam face 59 thereby facilitating automatic locking of the platform bracket 11 and the column 14 to the base 10 upon movement from an inclined tire loading position to an upright tire dismounting position.

An elongated post 65 is illustrated in FIG. 7 as mounted on a base plate 66 in an upright position to provide a path of travel substantially parallel to the axis of the spindle 17, when the column 14 is in an upright tire dismounting position. A pair of laterally opposed sets of elevationally spaced guides 67 secured to the base 10 provide longitudinally extended laterally opposed grooves 68 in which the base plate 66 is received. Accordingly, the base plate 66 is adapted for reciprocal movement toward and away from the column 14 to accommodate variations in the diameter of the wheel to be supported thereon during the tire dismounting process.

Means to adjust and maintain the position of the post 65 relative to the column 14 are provided by an adjustment lug 70 rigidly secured to the base plate 66 and most clearly illustrated in FIG. 4. The lug 70 is provided with an internally threaded bore 71 in which a complementary externally threaded rod 72 is received. Upon rotation of the rod 72, axial relative movement occurs between the lug 70 and the rod. An anchor 73 in the form of an annular flange is rigidly secured to one end of the rod and rotatably received in an anchorage bracket 74 secured to the base 10. An operating handle 75 is carried by the opposite end of the rod 72 to facilitate adjustment of the position of the post 65 radially relative to the primary axis of rotation of the spindle 17. Accordingly, appropriate rotation of the handle 75 effects movement of the post 65 either toward or away from the column 14 to accommodate various sizes of wheel assemblies 20.

As illustrated in FIGS. 2 and 7, a carriage 80 is longitudinally slidably mounted on the post 65 for reciprocation along the path of travel defined thereby. As can be seen most clearly in FIG. 2, an arm 81 is rigidly extended from the carriage 80 and connected to a pressure fluid actuated ram 82 secured to the base plate 66. Controlled extension and retraction of the ram 82 is effected by a valve 83 in fluid communication with the source of fluid pressure 47 by means of a conduit 84. A pair of flexible conduits 85 are connected between the control valve 83 and the ram 82 to effect extension and retraction of the ram.

Referring again to FIG. 7, the carriage 80 is provided with respective upper and lower latches 86 and 87 pivotally connected to the carriage 80 by means of respective pivot pins 88 and 89. The upper latch 86 is provided with a locking notch 90, while the lower latch 87 is provided with a similar notch 91. Both of the latches 86 and 87 are provided with an operating handle respectively indicated at 92 and 93.

As shown in FIG. 2, an upper tubular slide 100 is mounted on the post 65 for longitudinal reciprocal movement thereon adjacent to one end of the carriage 80. The slide 100 is provided with a bracket 101 carrying a pivot pin 102 affording a pivotal axis for a lever 103 mounted thereon. A bearing 104 is carried at one end of the lower 103 and provides an axis of rotation which is substantially coplanar with the primary axis of rotation afforded by the spindle 17, but is outwardly downwardly divergent from the primary axis in a direction toward the tire 34.

A biasing spring 105 is connected between the bracket 101 and the lever 103 at the end opposite from the bearing 104. A disc-shaped shoe 106, having a pressure face 107 adapted to engage the side wall of the tire 34 adjacent to a bead thereof, is provided with an axle 108 rigidly extended therefrom and substantially concentric therewith. The axle is rotatably mounted in the bearing 104 to permit rotation of the shoe 106 while the pressure face 107 is in engagement with the tire. The biasing spring 105 resists rocking movement of the lever 103 during engagement of the tire by the shoe 106 and effects a return of the lever to a position wherein the axis of the bearing 104 is outwardly divergently directed toward the tire away from the primary axis of the spindle 17.

A spring 110 is secured at one end to the post 65 and at its opposite end to the bracket 101 of the slide 100. The spring 110 urges the slide 100 in a direction away from the tire 34. A storage latch 111 is adapted to receive a dog 112 extended from the slide 100 thereby to maintain the slide in an upper retracted position, as shown in FIG. 2. A handle 113 is provided on the latch and is urged toward a locking position by a spring 114. A lug 115 is rigidly extended from the slide 100 and adapted to be engaged by the latch 86 of the carriage 80, thereby dependably releasably connecting the slide 100 to the carriage for movement therewith upon release of the latch 111.

A lower slide 120 is longitudinally reciprocably mounted on the post 65 on that side of the carriage 80 opposite from the slide 100, and is gravitationally biased toward the base plate 66. The slide 120 includes an integral bracket 121 in which is mounted a pivot pin 122. The pin provides a transversely disposed axis for a lever 123 mounted thereon and carrying a bearing 124 at one end thereof. The bearing affords an axis of rotation substantially coplanar with the primary axis of rotation of spindle 17 and outwardly divergently directed therefrom toward the tire 34. A spring 125 interposed the slide 120 and the opposite end of lever 123 urges the bearing to a position of maximum divergence of said axes of rotation. A disc-shaped shoe 126 is provided with a pressure face 127 adapted to engage the tire 34 upon movement of the slide 120 longitudinally upwardly of the post 65. The shoe 126 carries a concentric axle 128 rotatably mounted in the bearing 124 which permits rotation of the shoe while in engagement with the tire. A lug 129 is extended from the slide 120 to provide detachable connection with the carriage 80. It will be noted that the spring 125 urges the lever 123 about the axis afforded by the pivot pin 122 to position the axis of the bearing 124 in an outwardly divergent direction toward the tire 34 relative to the primary axis of the spindle 17, and resists rocking of the lever upon engagement of the shoe 126 with the tire 34.

Operation

The operation of the described embodiment of the subject invention is believed to be readily apparent and is briefly summarized at this point. It is assumed initially that the column 14 is in an upright tire dismounting position, as shown in full lines in FIG. 3. To facilitate movement of the column to the wheel loading position, shown in dashed lines, the release lever 57 is rocked in a clockwise direction, as viewed in FIG. 5, thereby moving the link 55 to the right and pivoting the latches 51 in a clockwise direction to release the locking bar 50. Subsequent extension of the ram 40 pivots the bracket 11 about the substantially horizontal axis afforded by the shaft 12 and moves the column 14 to a wheel loading and discharging position, shown in dashed lines in FIG. 3. In such a position, the strut 48 rests upon the surface of support 49.

The clamping member 19 is then removed from the screw-threaded end of the spindle 17, and a wheel assembly 20 is rolled into position so that it may gravitationally move to the position shown in dashed lines in engagement with the table 18. The clamping member 19 is then returned to the spindle 17 and releasably secures the wheel assembly to the spindle 17 by reason of the clamping action between member 19 and the table 18.

Subsequent retraction of the ram 40 pivots the bracket 11 about the axis of the shaft 12 and returns the column 14 to an upright tire dismounting position, as shown in full lines in FIG. 3. At the terminal portion of such movement, the locking bars 50 engage the cam faces 59 of the latches 51, so that the latches are urged out of the path of movement of the locking bars 50 and returned to a latching position by reason of the spring 56.

As an initial step in urging the tire bead 36 from rim flange 32, latch 87 is released from the lower slide 120 which frees the connecting lug 129 thereof. Extension of the ram 82 under the control of valve 83 raises the carriage 80 to a position to engage the connecting lug 115 of the upper slide 100. Subsequent release of storage latch 111 followed by retraction of the ram 82 upon appropriate positioning of valve 83 moves the slide 100 downwardly in a path of travel substantially parallel to the axis of the spindle 17. Continued downward movement engages the shoe 106 by means of its pressure face 107 with the side wall of the tire 34 adjacent the bead 36. Continued retraction of the ram 82 exerts an axial force against the side wall of the tire, the line of action of the force being substantially parallel to the axis of rotation of the spindle 17.

Concurrently with the application of the axial force, the drive motor 24 is energized through switch 26 to effect rotation of the wheel through sprocket 23, chain 22, and sprocket 21 affixed to the lower end of the spindle 17. Since the disc-shaped shoe 106 is rotatably mounted on lever 103, rotation of the wheel assembly also effects a rotation of the shoe in the bearing 104. Continued retraction of the ram 82 exerts a still greater force on the side wall of the tire 34 and rocks the lever 103 in a clockwise direction about the pivot 102, as viewed in FIG. 2. Rocking movement continues until limited by a stop 116 carried in the bracket 101.

As soon as sufficient force has been applied by the ram 82 through pressure face 107 of the shoe 106, the bead 36 is moved axially out of engagement with the rim flange 32. Further retraction of the ram 82 is then terminated while the rim flange 32 is removed from the wheel assembly 20. The ram 82 is then extended to move the slide 100 upwardly out of engagement with tire 34 until positioned as shown in FIG. 2 in engagement with the storage latch 111. The upper latch 86 of the carriage 80 is then disengaged from the lug 115 so that the carriage may be moved downwardly under the influence of ram 82, while the slide 100 is maintained in an upper storage position.

The lower latch 87 of the carriage 80 is then releasably connected to the lug 129 of lower slide 120. Extension of the ram 82 under the influence of pressure fluid supplied through source 47 and under the control of valve 83 moves the shoe 126 into engagement with the tire 34. As in the case of the upper slide 100, upon engagement of the side wall of the tire adjacent the bead 35 by the pressure face 127, the lever 123 is rocked in a counterclockwise direction, as viewed in FIG. 2, about the transverse axis afforded by the pivot pin 122. This counterclockwise rocking movement is resisted by biasing spring 125, however, the force exerted by the ram 82 and the resistance to movement occasioned by the adherence of the bead 35 to the rim flange 31 is sufficient to overcome the force of the spring 125. Continued rotation of the wheel assembly by the drive motor 24, effects an axial application of force to the bead of the tire circumferentially about the tire so that the force is only momentarily localized. Consequently, the bead of the tire is quickly loosened from the rim flange 31 without risk of injury to the side wall of the tire. Since the opposite bead 36 had been previously loosened and the rim flange 32 removed, the ram 82 may be further extended to move the tire 34 axially of the wheel and completely dismount it therefrom.

Following dismounting of the tire from the rim, the column 14 is returned to a wheel loading and discharging position by appropriate release of the locking bars 50 upon movement of the lever 57, as described above. Subsequent extension of the ram 40 moves the column 14 to a wheel loading and discharging position. Removal of the clamping member 19 then permits discharge of the wheel 20 from the table 18 of the spindle 17.

The tire supporting and dismounting apparatus of the present invention readily accommodates various wheel diameters by appropriate adjustment of the relative position of the post 65 and the spindle 17. Such adjustment is effected by rotation of the handle 75 of the threaded rod 72. This moves the base plate 66 radially of the primary axis of rotation afforded by the spindle 17, so that the shoes 106 and 126 are permitted to engage the side wall of the tire 34 immediately adjacent the respective beads thereof. By so adjusting the position of the post 65 relative to the axis of the spindle 17, the force exerted by the ram 82 is applied at a point immediately adjacent to the bead of the side wall. Also, in view of the parallel relationship of the spindle 17 of the post 65, the line of action of such force is substantially parallel to the axis of rotation of the wheel. Consequently, scuffing of the tire side wall and any concentrated localized application of force is prevented.

Accordingly, the present invention provides tire dismounting apparatus which readily accommodates various tire sizes and easily moves the heads of the tire side wall out of engagement with the rim flanges without overturning the tire. In addition, the invention readily permits loading and unloading of the wheel and tire assembly without the necessity of manually lifting such heavy assemblies and without danger to workmen performing such duties.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. Apparatus to support a wheel assembly having a rim and a tire mounted thereon, the tire providing axially opposed side walls and beads carried thereby in sealing contact with said rim, the apparatus being adapted to move the tire beads axially away from the rim and comprising a base; an elongated column mounted on the base; a spindle rotatably mounted in the column and affording a primary axis of revolution; wheel clamping means carried by the spindle and adapted to support the wheel assembly for rotation about said axis; an elongated post; means mounting the post on the base in a position radially spaced from and substantially parallel to said axis; a carriage longitudinally slidably mounted for reciprocation on the post; power means carried by the base and operatively connected to the carriage to effect reciprocation thereof; a first slide carried on the post for relative reciprocal longitudinal movement adjacent one side of the carriage; a second slide carried on the post for relative reciprocal longitudinal movement adjacent the opposite side of the carriage; a pair of circular shoes each having a respective pressure surface adapted to engage a respective one of the side walls of the tire adjacent the beads thereof; means mounting a respective one of said shoes on each of said slides for rotation about a respective axis inclined relative to said primary axis, each of said respective axes being substantially coplanar with said primary axis and being extended toward the tire in a direction outwardly divergent from said primary axis; means carried by each of said slides for individual selective releasable connection with said carriage; and power means carried by the base and operatively connected to said spindle to rotate the tire assembly while one of said shoes is in contact with and exerting a force on a respective side wall of the tire.

2. Apparatus to support a wheel assembly having a rim and a tire mounted thereon, the tire providing axially opposed side walls and beads carried thereby in sealing contact with said rim, the apparatus being adapted to move the tire beads axially away from the rim and comprising a base; an elongated column; means mounting the column on the base for pivotal movement about a substantially horizontal axis for movement between a raised tire dismounting position and a lowered wheel loading position; a spindle rotatably mounted in the column and affording a primary axis of revolution; wheel clamping means carried by the spindle and adapted to support the wheel assembly for rotation about said axis; an elongated post; means mounting the post on the base in a position radially spaced from and substantially parallel to said axis when the column is in a raised tire dismounting position; a carriage longitudinally slidably mounted for reciprocation on the post; power means carried by the base and operatively connected to the carriage to effect reciprocation thereof; a first slide carried on the post for relative reciprocal longitudinal movement adjacent one side of the carriage; a second slide carried on the post for relative reciprocal longitudinal movement adjacent the opposite side of the carriage; a pair of circular shoes each having a respective pressure surface adapted to engage a respective one of the side walls of the tire adjacent the beads thereof; means mounting a respective one of said shoes on each of said slides for rotation about a respective axis inclined relative to said primary axis, each of said respective axes being substantially coplanar with said primary axis and being extended toward the tire in a direction outwardly divergent from said primary axis; means carried by each of said slides for individual selective releasable connection with said carriage; and power means carried by the base and operatively connected to said spindle to rotate the tire assembly while one of said shoes is in contact with and exerting a force on a respective side wall of the tire.

3. Apparatus to support a wheel assembly having a rim and a tire mounted thereon, the tire providing axially opposed side walls and beads carried thereby in sealing contact with said rim, the apparatus being adapted to move the tire beads axially away from the rim and comprising a base; an elongated column mounted on the base; a spindle rotatably mounted in the column and affording a primary axis of revolution; wheel clamping means carried by the spindle and adapted to support the wheel assembly for rotation about said axis; an elongated post; means mounting the post on the base in a position radially spaced from and substantially parallel to said axis; a carriage longitudinally slidably mounted for reciprocation on the post; power means carried by the base and operatively connected to the carriage to effect reciprocation thereof; a first slide carried on the post for relative reciprocal longitudinal movement adjacent one side of the carriage; a second slide carried on the post for relative reciprocal longitudinal movement adjacent the opposite side of the carriage; a pair of circular shoes each having a respective pressure surface adapted to engage a respective one of the side walls of the tire adjacent the beads thereof; means mounting a respective one of said shoes on each of said slides for rotation about a respective axis inclined relative to said primary axis, each of said respective axes being substantially coplanar with said primary axis and being extended toward the tire in a direction outwardly divergent from said primary axis, said mounting means including means permitting angular change of the divergence of said respective axes of said shoes during rotation of the wheel assembly while the respective surface of one of said shoes is in engagement with the tire; biasing means carried by each of the slides and engaging said mounting means to resist said angular change; stop means carried by each slide and limiting the range of movement of said respective axes in making said angular change; means carried by each of said slides for individual selective releasable connection with said carriage; and power means carried by the base and operatively connected to said spindle to rotate the tire assembly while one of said shoes is in contact with and exerting a force on a respective side wall of the tire.

4. Apparatus to support a wheel assembly having a rim and a tire mounted thereon, the tire providing axially opposed side walls and beads carried thereby in sealing contact with said rim, the apparatus being adapted to move the tire beads axially away from the rim and comprising a base; an elongated column mounted on the base; a spindle rotatably mounted in the column and affording a primary axis of revolution; wheel clamping means carried by the spindle and adapted to support the wheel assembly for rotation about said axis; an elongated post; means mounting the post on the base in a position radially spaced from and substantially parallel to said axis; a carriage longitudinally slidably mounted for reciprocation on the post; power means carried by the base and operatively connected to the carriage to effect reciprocation thereof; a first slide carried on the post for relative reciprocal longitudinal movement adjacent one side of the carriage; a second slide carried on the post for relative reciprocal longitudinal movement adjacent the opposite side of the carriage; each of said slides being provided with a respective bracket rigidly mounted thereon, a pivot pin carried by the bracket and affording a transverse axis substantially normal to said primary axis, an elongated lever having opposite ends and mounted intermediate thereof on said pin for rocking movement about said transverse axis, one of said ends affording a bearing providing an axis of rotation, a circular shoe having a pressure surface adapted to engage the side wall of the tire, an axle rigidly concentrically extended from the shoe and rotatably mounted in the bearing, biasing means interconnecting said slide bracket and the opposite end of said lever and resisting rocking movement of the lever during engagement of the tire by the shoe and to return the lever to a position wherein the axis is outwardly divergently directed toward the tire, and stop means to limit the rocking return movement of said lever; means carried by each of said slides for individual selective releasable connection with said carriage; and power means carried by the base and operatively connected to said spindle to rotate the tire assembly while one of said shoes is in contact with and exerting a force on a respective side wall of the tire.

5. Apparatus to support a wheel assembly having a rim and a tire mounted thereon, the tire providing axially opposed side walls and beads carried thereby in sealing contact with said rim, the apparatus being adapted to move the tire beads axially away from the rim and comprising a base; an elongated column mounted on the base; a spindle rotatably mounted in the column and affording a primary axis of revolution; wheel clamping means carried by the spindle and adapted to support the wheel assembly for rotation about said axis; an elongated post; means mounting the post on the base in a position radially spaced from and substantially parallel to said axis; a carriage longitudinally slidably mounted for reciprocation on the post; power means carried by the base and operatively connected to the carriage to effect reciprocation thereof; a first slide carried on the post for relative reciprocal longitudinal movement adjacent one side of the carriage; a second slide carried on the post for relative reciprocal longitudinal movement adjacent the opposite side of the carriage; each of said slides being provided with a respective bracket rigidly mounted thereon, a pivot pin carried by the bracket and affording a transverse axis substantially normal to said primary axis, an elongated lever having opposite ends and mounted intermediate thereof on said pin for rocking movement about said transverse axis, one of said ends affording a bearing providing an axis of rotation, a circular shoe having a pressure surface adapted to engage the side wall of the tire, an axle rigidly concentrically extended from the shoe and rotatably mounted in the bearing, and biasing means interconnecting said slide bracket and the opposite end of said lever and resisting rocking movement of the lever during engagement of the tire by the shoe and to return the lever to a position wherein the axis is outwardly divergently directed toward the tire; stop means carried by said first slide to limit the rocking return movement of its respective lever; means carried by each of said slides for individual selective releasable connection with said carriage; and power means carried by the base and operatively connected to said spindle to rotate the tire assembly while one of said shoes is in contact with and exerting a force on a respective side wall of the tire.

6. Apparatus to support a wheel assembly having a rim and a tire mounted thereon, the tire providing axially opposed side walls and beads carried thereby in sealing contact with said rim, the apparatus being adapted to move the tire beads axially away from the rim and comprising a base; an elongated column mounted on the base; means mounting the column on the base for pivotal movement about a substantially horizontal axis for movement between raised tire dismounting position and a lowered wheel loading position; a spindle rotatably mounted in the column and affording a primary axis of revolution; wheel clamping means carried by the spindle and adapted to support the wheel assembly for rotation about said axis; an elongated post; means mounting the post on the base in a position radially spaced from and substantially parallel to said axis; a carriage longitudinally slidably mounted for reciprocation on the post; power means carried by the base and operatively connected to the carriage to effect reciprocation thereof; a first slide carried on the post for relative reciprocal longitudinal movement adjacent one side of the carriage; a second slide carried on the post for relative reciprocal longitudinal movement adjacent the opposite side of the carriage; each of said slides being provided with a respective bracket rigidly mounted thereon, a pivot pin carried by the bracket and affording a transverse axis substantially normal to said primary axis, an elongated lever having opposite ends and mounted intermediate thereof on said pin for rocking movement about said transverse axis, one of said ends affording a bearing providing an axis of rotation, a circular shoe having a pressure surface adapted to engage the side wall of the tire, an axle rigidly concentrically extended from the shoe and rotatably mounted in the bearing, and biasing means interconnecting said slide bracket and the opposite end of said lever and resisting rocking movement of the lever during engagement of the tire by the shoe and to return the lever to a position wherein the axis is outwardly divergently directed toward the tire; stop means carried by said first slide to limit the rocking return movement of its respective lever; means carried by each of said slides for individual selective releasable connection with said carriage; and power means carried by the base and operatively connected to said spindle to rotate the tire assembly while one of said shoes is in contact with and exerting a force on a respective side wall of the tire.

References Cited by the Examiner
UNITED STATES PATENTS 2,920,664    1/60    Lomen et al. _____ 157—1.24 X
3,086,578    4/63    Breazeale et al. _____ 157—1.24

GRANVILLE Y. CUSTER, Jr., *Primary Examiner.*